United States Patent [19]

Helwig et al.

[11] Patent Number: 4,882,095

[45] Date of Patent: Nov. 21, 1989

[54] PREPARATION OF ALKOXY(ISO)VIOLANTHRENEDIONES

[75] Inventors: Reinhard Helwig, Gruenstadt; Helmut Hoch, Weisenheim, both of Fed. Rep. of Germany

[73] Assignee: BASF Aktiengesellschaft, Ludwigshafen, Fed. Rep. of Germany

[21] Appl. No.: 246,312

[22] Filed: Sep. 19, 1988

[30] Foreign Application Priority Data

Sep. 22, 1987 [DE] Fed. Rep. of Germany ....... 3731809

[51] Int. Cl.$^4$ ................................................. C07C 3/22
[52] U.S. Cl. ........................................................ 552/279
[58] Field of Search .................................. 260/357, 358

[56] References Cited

U.S. PATENT DOCUMENTS

| | | | |
|---|---|---|---|
| 2,042,414 | 5/1936 | Sobatzki et al. | 260/357 |
| 2,140,455 | 12/1938 | Howell | 260/357 |
| 2,503,823 | 4/1950 | Huber et al. | 260/357 |
| 4,110,355 | 8/1978 | Bloom | 260/373 |
| 4,307,022 | 12/1981 | Vallette | 260/369 |

FOREIGN PATENT DOCUMENTS

| | | |
|---|---|---|
| 146638 | 9/1972 | Czechoslovakia . |
| 417068 | 8/1925 | Fed. Rep. of Germany . |
| 468957 | 11/1928 | Fed. Rep. of Germany . |
| 2900630 | 7/1979 | Fed. Rep. of Germany . |
| 100194 | 10/1923 | Switzerland . |

OTHER PUBLICATIONS

BIOS 987, pp. 69-70, Indanthrene Brilliant Green B and FFB.

*Primary Examiner*—Richard L. Raymond
*Assistant Examiner*—Raymond Covington
*Attorney, Agent, or Firm*—Oblon, Spivak, McClelland, Maier & Neustadt

[57] ABSTRACT

A process for the preparation of bisalkoxy(iso)violanthrenediones involves alkylating the corresponding bishydroxyl compounds in an organic reaction medium with methyl benzoate as the reaction medium.

The ester can easily be regenerated and is stable under the reaction conditions.

16 Claims, No Drawings

PREPARATION OF ALKOXY(ISO)VIOLANTHRENEDIONES

It has long been known that valuable vat dyes can be obtained by alkylating dihydroxyviolanthrenedione or dihydroxyisoviolanthrenedione. For some important representatives of this class, the prior art may be described as follows:

(a) methylation of 16,17-dihydroxyviolanthrene-5,10-dione using methyl o/p-toluenesulfonate or dimethyl sulfate in nitrobenzene (U.S. Pat. Nos. 2,042,414, 2,140,455 and 2,503,823; Soviet Union Patent No. 46,644); in trichlorobenzene (Swiss Patent No. 100,194, U.S. Pat. No. 2,503,823, CZ. 146,638 and BIOS 987, 69, 70); in a mixture of lamp oil and polychlorobenzenes (Soviet Union Patent No. 52,940, ref. in C. 1939, I, 1864) or in hydrocarbons having a boiling point of from 80° to 140° C. (Soviet Union Patent No. 1,028,699; ref. in C.A. 100 (1984) : 35845 q); in addition, methylation using dimethyl methanephosphonate in nitrobenzene, trichlorobenzene, naphthalene or in an excess of the alkylating agent (German Laid-Open Application DOS No. 2,900,630); (b) ethylation of 16,17-dihydroxyviolanthrene-5,10-dione using diethyl sulfate in nitrobenzene or dichlorobenzene (German Patent 417,068); Friedländer 15, 761); (c) methylation of 6,15-dihydroxyisoviolanthrene-9,18dione in nitrobenzene using dimethyl sulfate (German Patent No. 417,068) or using methyl p-toluenesulfonate (German Patent No. 468,957; Friedländer 16, 1490).

The process of the prior art is disadvantageous from an ecological point of view due to the solvents used therein as the reaction medium.

It is an object of the present invention to provide a process for the preparation of alkoxy-substituted-(iso)-violanthrenediones which does not have the ecological disadvantages of the abovementioned processes.

We have found that this object is achieved by a process for the preparation of a bisalkoxy(iso)violanthrenedione of the formula

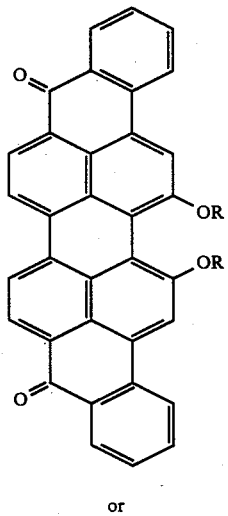

(I)

or

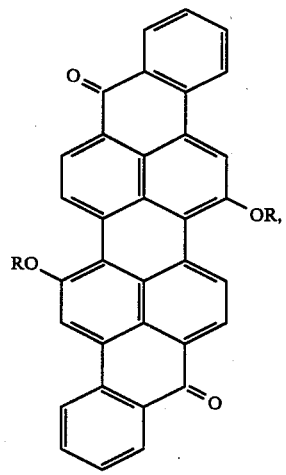

(II)

where R is $C_1$–$C_4$-alkyl, by alkylating the corresponding bishydroxyl compound (R=H) in an organic liquid as the reaction medium in the presence of an alkali metal a salt of a weak acid and a tertiary aliphatic and/or tertiary aromatic amine, a tertiary aliphatic amine being preferred, at from 100° to 200° C., which comprises using methyl benzoate as the organic liquid.

It is surprising, and also unforseeable for those skilled in the art, that the methyl benzoate to be used according to the invention as the reaction medium survives the conditions of the reaction and regeneration without notable decomposition since it was known that methyl benzoate tends to hydrolyze under alkaline conditions (cf., for example, Farbe und Lack, 1941, 142; Chem Zentralblatt 1913, II, 1047; Ullmann, Encyclopädie der technischen Chemie [Encyclopedia of industrial chemistry], 4th edition, Vol. 8, (1974), 371).

The reaction medium used in the process according to the invention is readily biodegradable, readily regenerable and readily extracted from the exhaust air. The desired reaction takes place just as quickly and completely in this medium as in the solvents of the prior art.

A further advantage of the reaction medium to be used according to the invention is its very low toxicity.

For the reaction, 5 to 15 times the amount by weight of methyl benzoate, based on the dihydroxy(iso)violanthrenedione compound, preferably 8 to 12 times the amount by weight, are generally used. It is also possible to use larger amounts of methyl benzoate, which, apart from the larger amount to be regenerated, causes no disadvantages for the reaction, but neither does it bring about any advantages.

In the process of the present invention, the alkylation is carried out at from 100° to 200° C., preferably at 140° to 190° C., depending on the alkylating agent. In order to complete the alkylation, it is also possible to increase the temperature after addition of the alkylating agent.

Suitable alkali metal salts of weak acids are alkali metal carbonates and alkali metal bicarbonates.

In order to obtain high yields of the desired dyes, the alkylation is carried out, as in the processes of the prior art, in the presence of small amounts of tertiary aliphatic amines, such as triethylamine, tripropylamine, tributylamine, tripentylamine, trihexylamine, triethanolamine or mixtures thereof, and/or in the presence of tertiary aromatic amines, such as N,N-dimethylaniline or N,N- diethylaniline; aliphatic tertiary amines are preferred. In general, the total amounts of these amines are below 20% by weight, based on the hydroxyl compound to be alkylated.

Suitable alkylating agents are those known from the prior art, for example dialkyl sulfates such as dimethyl sulfate, diethyl sulfate, dipropyl sulfate and dibutyl sulfate, alkyl o- and p-toluenesulfonates, such as the methyl and ethyl esters, alkyl benzenesulfonates, such as the methyl and ethyl esters, and dimethyl and diethyl methanephosphonates.

The reaction mixture is worked up in a customary manner. Thus, the products can be isolated by simple or suction filtration, and residues of the adhering solvent are removed either by washing with a water-soluble organic solvent e.g. methanol, and subsequently with water, or by treatment with hot water and/or steam. However, it is also possible to isolate the products by removing the solvent by distillation at elevated temperature and under reduced or atmospheric pressure, it being possible to remove contaminants by subsequent purification steps, eg. by treatment with water or acids.

The examples below are intended to illustrate the invention in greater detail. Parts and percentages are by weight.

EXAMPLE 1

(C.I. Vat Green 1; C.I. No. 59 825)

280 parts of methyl benzoate, 30 parts of 16,17-dihydroxyviolanthrene-5,10-dione, 42 parts of potash, 2 parts of tributylamine and 3 parts of dimethylaniline are stirred for 3 hours at 120° C. and subsequently for 3 hours at 150° to 160° C. while separating off the water of reaction. 31.5 parts of dimethyl sulfate are then added dropwise at 150° C. over the course of 1.5 hours, and the temperature is kept at 150° C. for a further 3 hours. After cooling to from 80° to 90° C., the excess dimethyl sulfate is destroyed by running 62 parts of a 6% strength aqueous ammonia solution into the mixture. The suspension, at from 70° to 80° C., is filtered under suction, and the residue is washed with 190 parts of methyl benzoate at 80° C. The residue is freed from the remaining solvent by washing with methanol and water and is dried. Yield: 30 parts of dye.

The same result is obtained if the residue is freed from remaining solvent by steam distillation.

EXAMPLE 2

30 parts of 16,17-dihydroxyviolanthrene-5,10dione are added to 280 parts of methyl benzoate and 42 parts of potash at 80° C., the mixture is heated to 120° C., and 2 parts of tributylamine and 3 parts of dimethylaniline are added. The mixture is stirred for 4 hours at 120° C. and then for 2 hours at from 150° to 160° C. while separating off the water of reaction. 31.5 parts of dimethyl sulfate are subsequently added dropwise at 150° C. over the course of 3 hours, and the reaction mixture is stirred at 150° C. for a further 3 hours.

The further work-up is as in Example 1. 30 parts of dye are obtained.

EXAMPLE 3

The procedure is as in Example 2, but the dropwise addition of dimethyl sulfate is carried out at 140° C. and the mixture is stirred for a further 3 hours at 160° C. Yield: 30 parts of dye.

EXAMPLE 4

The procedure is as in Example 2, but the dimethyl sulfate is replaced by 46.5 parts of a mixture of methyl o-toluenesulfonate and methyl p-toluenesulfonate, and the reaction mixture is stirred for a further 3 hours at from 170° to 180° C. 30 parts of dye are obtained.

EXAMPLE 5

The procedure is as in Example 4, but the mixture of methyl o-toluenesulfonate and methyl p-toluenesulfonate is replaced by 43 parts of methyl benzenesulfonate. The same result as in Example 4 is obtained.

EXAMPLE 6

The procedure is as in Example 2, but the dihydroxyviolanthrenedione is replaced by 30 parts of 6,15-dihydroxyisoviolanthrene-9,18-dione. 34.5 parts of the vat dye C.I. Vat Blue 26, C.I. No. 60 015 are obtained.

The dye may be purified, if necessary, by reprecipitation from sulfuric acid (cf. Friedländer 16, 1490).

EXAMPLE 7

The procedure is as in Example 6, but the dimethyl sulfate is replaced by 46.5 parts of a mixture of methyl o-toluenesulfonate and methyl p-toluenesulfonate, and the reaction mixture is stirred for a further 3 hours at 170° to 180° C. The same result as in Example 6 is obtained.

EXAMPLE 8

The procedure is as in Example 2, but the dimethyl sulfate is replaced by 38.5 parts of diethyl sulfate. 26 parts of the vat dye C.I. Vat Green 4, C.I. No. 59 835 are obtained. The dye can be purified, if necessary, by reprecipitation from sulfuric acid.

EXAMPLE 9

The procedure is as in Example 2, but no dimethylaniline is added. The same result as in Example 2 is obtained.

We claim:

1. A process for the preparation of a bisalkoxyviolanthrenediene or bisalkoxyisoviolanthrenedione of the formula

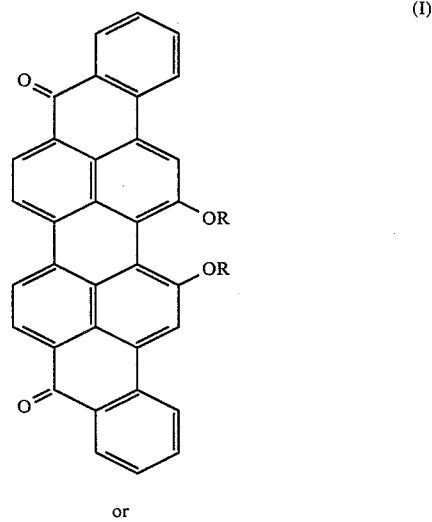

or

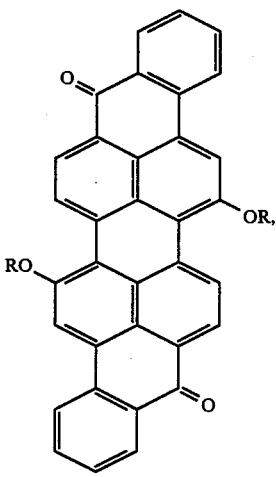

(II)

where R is $C_1$–$C_4$-alkyl, which comprises alkylating the corresponding bishydroxyl compound (R=H) in methyl benzoate as the reaction medium in the presence of an alkali metal salt of a weak acid and a tertiary aliphatic or tertiary aromatic amine, or a mixture of tertiary aliphatic and tertiary aromatic amines, at from 100° to 200° C.

2. A process as claimed in claim 1, wherein the alkylating agent used is dialkyl sulfate, alkyl o-toluenesulfonate, alkyl p-toluenesulfonate, alkyl benzenesulfonate, dialkyl methanephosphonate or a mixture of these agents, where alkyl has 1 to 4 carbon atoms.

3. A process as claimed in claim 1, wherein the alkali metal salt of a weak acid is sodium carbonate, potassium carbonate or a mixture thereof.

4. A process as claimed in claim 2, wherein the alkali metal salt of a weak acid is sodium carbonate, potassium carbonate or a mixture thereof.

5. A process as claimed in claim 1, wherein 16,17-dihydroxyviolanthrene-5,10-dione is methylated using dimethyl sulfate, methyl toluenesulfonate, methyl benzenesulfonate or a mixture thereof.

6. A process as claimed in claim 3, wherein 16,17-dihydroxyviolanthrene-5,10-dione is methylated using dimethyl sulfate, methyl toluenesulfonate, methyl benzenesulfonate or a mixture thereof.

7. A process as claimed claim 1, wherein 6,15-dihydroxyisoviolanthrene-9,18-dione is methylated using dimethyl sulfate, methyl toluenesulfonate, methyl benzenesulfonate or a mixture thereof.

8. A process as claimed in claim 3, wherein 16,15-dihydroxyviolanthrene-9,18-dione is methylated using dimethyl sulfate, methyl toluenesulfonate, methyl benzenesulfonate or a mixture thereof.

9. A process as claimed in claim 1, wherein 16,17-dihydroxyviolanthrene-5,10-dione is ethylated using diethyl sulfate, ethyl toluenesulfonate, ethyl benzenesulfonate or a mixture thereof.

10. A process as claimed in claim 3, wherein 16,17-dihydroxyviolanthrene-5,10-dione is ethylated using diethyl sulfate, ethyl toluenesulfonate, ethyl benzenesulfonate or a mixture thereof.

11. A process as claimed in claim 3, wherein 16,17-dihydroxyviolanthrene-5,10-dione is methylated.

12. A process as claimed in claim 3, wherein 16,17-dihydroxyisoviolanthrene-9,18-dione is methylated.

13. A process as claimed in claim 3, wherein 6,15-dihydroxyviolanthrene-5,10-dione is ethylated.

14. A process as claimed in claim 1, wherein 16,17-dihydroxyviolanthrene-5,10-dione is methylated.

15. A process as claimed in claim 1, wherein 16,17-dihydroxyisoviolanthrene-9,18-dione is methylated.

16. A process as claimed in claim 1, wherein 16,15-dihydroxyisoviolanthrene-5,10-dione is ethylated.

* * * * *